Jan. 28, 1936. B. BART 2,029,011
SEAMLESS TANK
Filed Feb. 2, 1931 2 Sheets-Sheet 1

INVENTOR
BLASIUS BART
BY Warren S. Orton
ATTORNEY

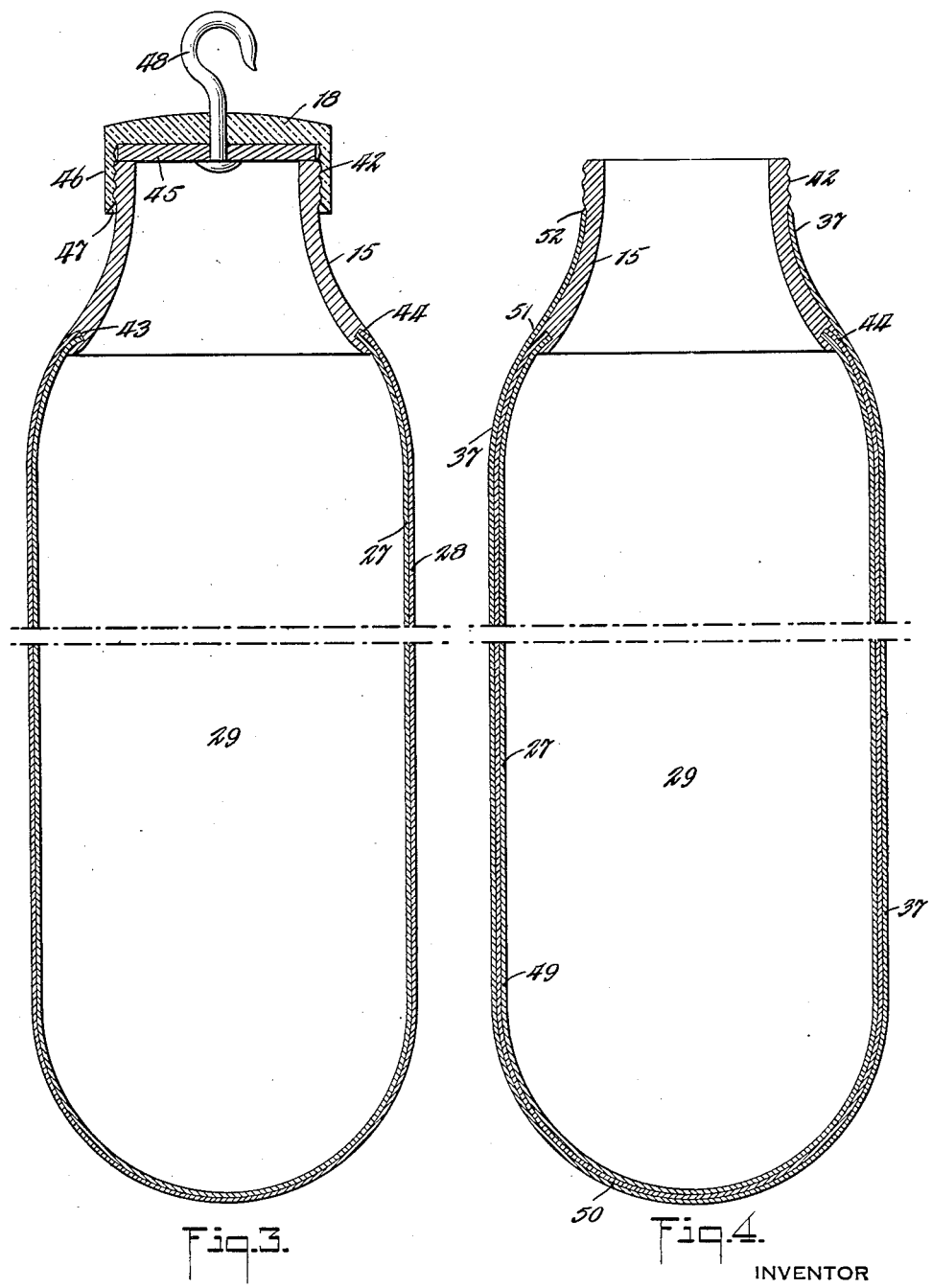

Patented Jan. 28, 1936

2,029,011

UNITED STATES PATENT OFFICE 2,029,011

SEAMLESS TANK

Blasius Bart, East Orange, N. J.

Application February 2, 1931, Serial No. 512,992

5 Claims. (Cl. 204—6)

The invention relates to an improvement in receptacles, tubing, pressure tanks and other hollow articles formed primarily of a shell of laminated, electrolytically deposited layers of different metals, to a method of manufacturing such articles and to an assemblage of incomplete parts of the article with accessories to form a mold for use in an electrolytic bath.

The invention specifically relates to a seamless metallic tank designed to contain chemicals.

The present disclosure constitutes an improvement and development of the invention disclosed in my co-pending application entitled "High pressure tanks", Serial No. 512,990, filed February 2, 1931, and constitutes a companion case to application entitled "Electrolytically formed tanks", Serial No. 512,991, filed February 2, 1931, and divisional application entitled "High pressure tanks", Serial No. 756,041, filed December 5, 1934.

In the application entitled "High pressure tanks", there was disclosed a receptacle particularly designed to contain chemicals which were apt to attract the material of which the receptacle was made and which was designed to resist high internal pressure, as would be the case with chemical fire extinguishers. There was featured a mold in which the shell comprising the tank was formed by electrolytic deposition and which mold was removed through a constricted outlet formed in the shell by dissolving, melting or otherwise reducing the mold into such fluid form as would permit it to be poured out of the formed receptacle.

In the application entitled "Electrolytically formed tanks", there was disclosed a similar character of receptacle, the initially formed part of which was designed to permit the removal therefrom of the mold structure intact and thus preserved in its original form available for repeated re-use. In such case the lower end of the shell from which the mold was removed was closed in the completed article mainly by means of a preformed bottom forming member. The preformed member in its engagement with the electrolytically formed shell presented an annular joint or exposed shoulder which subsequently had to be filled with solder and smoothed to provide the necessary continuous surface across the same to receive the external coating of electrolytically deposited metal. The present disclosure features a similar construction of high pressure receptacle in which the bottom forming member of the above identified application is omitted, and the bottom of the tank formed integrally with the other electrolytically deposited shell portion thus avoiding the soldered joint referred to above.

The primary object of this invention, as was the object of the disclosures in the above identified applications, is to provide a hollow article of the type outlined which can be formed economically; which can be formed with any desired structural strength; in which the interior or other surface engaging the mold will retain its original finish; which will permit the use and repeated re-use of the same mold or part thereof without destroying the same in the process of use; which will be free or substantially free of joints; and in general which will provide an inexpensive, rugged hollow article, free of seams or other parts which might mar the desired smooth, rounded appearance and which will have a pleasing, artistic appearance.

Another object of the invention is to provide an improved method by means of which seamless articles of the type above identified may be constructed economically, and the method herein particularly features the use of mold parts which can be removed intact after each succeeding formation of the article or part of the article deposited thereon, and under conditions even where the opening or throat of the completed article is smaller than the mold parts removed therefrom.

Various other objects and advantages of the invention will be in part obvious from a consideration of the method features of the disclosure and from an inspection of the accompanying drawings and in part will be more fully set forth in the following particular description of one method of practicing the invention, and the invention also consists in certain new and novel modifications of the preferred method and other features of construction and combinations of parts hereinafter set forth and claimed.

In the accompanying drawings:

Fig. 3 is a similar view of the parts shown in the preceding figure with the chuck removed, with a stopping off cap in position and the parts assembled ready to be inserted in an electrolytic tank to have a final coating layer positioned thereon and constituting the final step of the method; and Fig. 4 is a similar view showing the completely formed article ready for use.

Figures 1, 2:
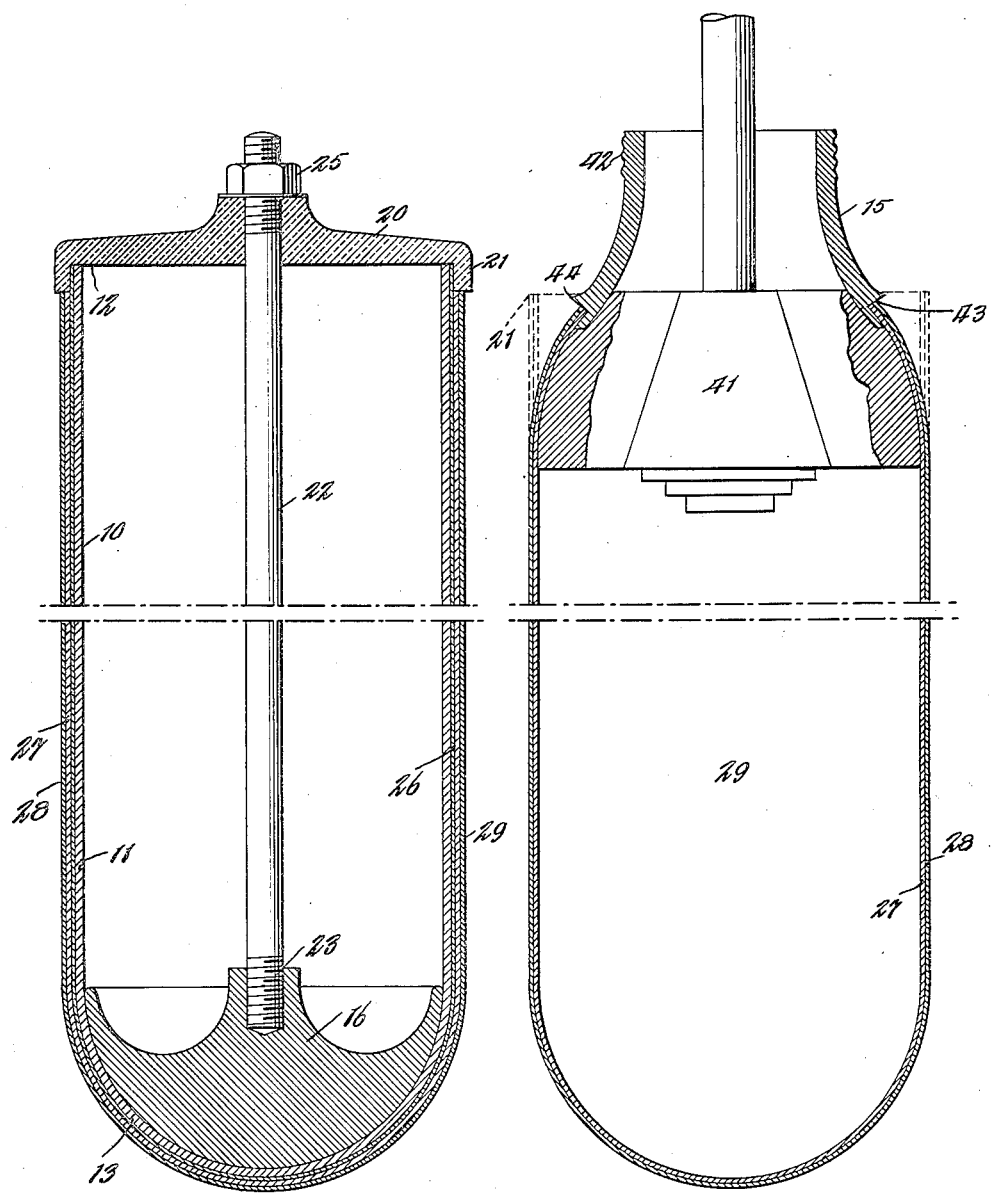
Fig. 1 is a view in axial section of a mold apparatus with a shell forming part of the finished article in position thereon with the electrolytically formed layers of metal increased in thickness and not in proportion and illustrating the assemblage constituting the initial step in the method of manufacturing the completed article.
Fig. 2 is a view similar to Fig. 1 with the mold removed, with a preformed collar inserted in place, and with the shell of Fig. 1 spun into engagement with the collar about a collapsible chuck, and showing the second step of the method.

Referring first to Fig. 1 of the drawings, there is shown a one piece seamless mold shell 10 including a cylindrical wall 11 entirely opened at its upper end 12 and merging at its opposite or lower end into a dome like bottom wall 13. Fitting within the wall 13 is a rugged, internal reinforcement for the mold comprising a shoulder 16 which may constitute the wall 13 where the mold shell 10 is a part of its reinforcement or may be secured to the wall but preferably is in frictional tight engagement with the wall in the illustrated instance.

The upper open end 12 of the mold shell 10 is closed by means of a blocking off plate 20 of insulating material and which includes a depending flange 21 surrounding the upper end of the cylindrical wall 11 and extending downwardly thereabouts for a short distance. The parts of the mold are secured together by means of a tie rod 22 which extends axially through the construction, has one end 23 in screw threaded engagement with the shoulder 16 and passes through the plate 20. A nut 25 engaging the upwardly projecting end of the tie rod is disposed to bear on the blocking off plate 20 and thus clamp the parts in the position shown in Fig. 1. An extremely thin layer 26, generally referred to as a flash of electrolytically deposited chromium extends about the outer, deposit-receiving surface of the mold 10. In the instant case the mold 10 is formed of electrolytically deposited nickel but it is within the scope of the disclosure to make this mold of any of the usual materials.

With the mold parts thus assembled, the construction is subjected to the action of an electrolytic bath. In the instant case, the assemblage is subjected to the action of such a bath containing nickel for a period of time until there is formed on the exposed part of the shell 10 an inner, thin layer 27 of electrolytically deposited nickel. This is attained under a current density of about twenty-five to thirty amperes per square foot.

The chromium faced mold so plated with nickel is removed from the nickel bath and is then subjected to the action of an electrolytic bath containing copper until a layer 28 of copper is formed on the initial nickel layer. These layers are of the order of approximately 5 to 15 thousandths of an inch thick so that the resultant tank shell 29 is about 20 thousandths of an inch thick. The copper is deposited with a current strength of about thirty to forty amperes per square foot.

With the shell thus formed, the nut 25 is loosened and the blocking off plate 20 removed. The outer exposed surface of the copper layer 28 is ground and polished to prepare the copper layer to receive subsequent layer or layers hereinafter described, and to heat expand the shell sufficient to insure an easy slipping of the shell 29 off the mold 10. This stripping of the electrolytic metal shell from the mold is most conveniently attained by using a stripping ring encircling the mold substituted for the flange 21 and bearing edgewise on the shell as indicated in the above identified application.

A collapsible chuck 41 is positioned within the open end of the shell 29 in spaced relation to its edge 12, as indicated in dotted lines in Fig. 2, and there is also located in the opening and concentric with the axis of the shell, a preformed tubular member or collar 15 constituting a part of the finished article. This collar is of an inverted funnel shape form, the upper reduced end of which is provided externally with screw threads 42 and the outer surface adjacent its lower enlarged edge is provided with an annular shouldered groove or recess 43 overlapped by a bendable lip 44 sufficiently thin so as to be easily peaned or rolled into overlapping engagement with the upper edge of the shell 29 following the fitting of the shell edge 12 into the lipped recess as shown in the succeeding position indicated in Figs. 2 and 3.

With the parts thus disposed in position, the assemblage is subjected to a spinning, drawing and reducing operation, following conventional practices in this respect, and the upper portion of the shell is rounded from its initial cylindrical form shown in Fig. 1 and in dotted lines in Fig. 2 into the curved shoulder form shown in full lines in Fig. 2 with the upper edge 21 snugly fitting into the recess 43. Finally, the lip 44 is peaned, pressed or rolled down into position securing the spun metal portion of the shell to the collar 15 as shown in Fig. 3. The chuck 41 is collapsed and withdrawn upwardly from the structure through the opening in the collar 15. A metallic supporting and conducting plate 45 is positioned on top of the collar 15 and a stopping off cap 18 is telescoped over the plate and secured by means of its flange 46 in engagement with the threads 42. It is noted that the lower edge of flange 46 is beveled upwardly and inwardly to form a reentrant angle 47 between the blocking off cap and the adjacent outer surface of the metal collar 15. A supporting and electric current conducting hook 48 extends through the cap 18 and has its lower end in electric conducting engagement with the conducting plate 45. With the parts thus assembled as indicated in Fig. 3, the same is positioned in an electrolytic tank until an outer coating layer 37 is formed thereon, extending integrally over all portions of shell 29, across the lower portion of collar 15 up to the constricted part provided with threads 42, extending across the joint formed at the lower sharp edge of lip 44. In the illustrated instance the outer layer 37 is formed of nickel, about twenty-five thousandths of an inch thick, which being formed on the polished copper layer 28 provides an extremely pleasing, smooth exterior to the finished article shown in Fig. 4 without any evidence of joints, rings or other parts to mar the smooth, rounded surface of the resulting tank.

When a sufficiently thick layer 37 is formed, the article is removed from the tank, the blocking off cap 18 is unscrewed; the plate 45 with hook 48 removed, and the finished tank as shown in Fig. 4 is in condition, ready for use without any further treatment.

The finished tank as shown in Fig. 4 includes the multi-layer shell 49, formed of shell 29 and outer layer 37, and which shell 49 comprises a body portion cylindrical for the major portion of its length and rounding therefrom at its lower end integrally into a dome-like semi-spherical bottom 50. At the upper end of the layer 37, the cylindrical portion rounds with a smooth double curve 51 into encircling engagement with the collar 15. The upper edge of the layer 37 terminates in a bevel 52 merging into the outer surface of the collar 15 just below the threads 42. The external effect is that a single, homogeneous layer of metal extends without external evidence of joints from the upwardly projecting exposed threaded end of the collar about the entire exposed surface of the article.

The collar 15 illustrated, is of brass and is made sufficiently rugged to provide the threads 42 used to secure a cover, or in the case of fire extinguishers, to provide a mounting for a pump, and has sufficient structural strength to cooperate with the electrolytically formed part to resist distortion of the article as a whole.

It is featured in this disclosure, as was the case in the companion application, that the mold parts shown in Fig. 1 be easily removed without damage, and reused as is except that in time the chromium plate 26 becomes worn with use and has to be replated to restore it to its original, smooth condition. It is additionally featured herein, that the collapsible chuck shown in Fig. 2 and the blocking off and supporting parts shown in Fig. 3, are not destroyed or in any way affected during the practicing of the operation herein disclosed. This means that the mold parts can be used repeatedly, thus insuring duplication in the replicas of the finished article; it simply being necessary to supply in addition to the electrolytically deposited metal a new collar 15 for each article formed. It is obviously within the scope of the disclosure to make the electrolytically deposited layers of any desired or required thickness and of any necessary number of layers of metal, and it is suggested that the structure be made up of alternate layers of different metals, the combination of copper and nickel having proven highly satisfactory, both with and without the special precious metal lining herein suggested.

The form of tank herein illustrated is characterized by its capacity to resist high internal pressure and at the same time to be light in weight and its freedom from joints or angles tends to distribute strain both external and internal and the minimizing of areas of weakness which might otherwise result in a rupture of the tank under abnormal service conditions. Tanks of this character are particularly adapted for use to contain chemicals which are liable to attack containers when made conventionally. It is suggested that by making the initial, inner layer 27 of gold, silver, platinum or other precious metals, and coating with nickel as herein suggested, there is provided a rugged tank which can depend upon its nickel coating for rigidness and which will present to the contained chemical a character of lining best suited to resist deleterious action of the chemicals thereon. In those cases where it is desired to retain the copper-nickel combination in the shell 29, and at the same time line the tank with silver, gold and other precious metals, the process outlined is practiced, depositing the lining metal on the mold and then following with nickel and copper so that shell 29 will in this case be of three layers of electrolytically deposited metal.

It has been found in practice that it is practically impossible to plate internal surfaces, this because of numerous inherent difficulties in attaining satisfactory deposits on interior surfaces. In the instant case, the plating of each layer is done on an exterior, exposed surface such as is presented by the mold shell. No difficulty is experienced in providing a satisfactory lining when the method herein disclosed is followed. The lining can be made uniform and in the instant case the lining 27 has been made of the order of three one-thousandths of an inch thick, but in the case of certain precious metals a much thinner lining can be employed with satisfactory results. Certain chemicals have a tendency to attack rough or relatively rough surfaces but are not so liable to attack the same surface provided it is highly polished. As any degree of polish can be given to the chromium plated shell in this instance, the resulting lining 27 will possess the same high degree of polish.

I claim:

1. In the art of forming hollow articles, the method which consists in locating in the open end of a cylindrical shell of electrolytically deposited metal a collapsible chuck, and a preformed metallic collar having an annular groove at one end and a bendable lip on the outside of the collar and lapping the groove and spinning the open end of the shell into the groove and causing the portion at the open end to conform to the outlines of the chuck and incidentally bending the lip into position to secure the open end of the shell in the groove, removing the chuck, positioning a blocking off member on the preformed member and subjecting the shell and exposed part of the preformed member to the action of an electrolytic tank to form thereon a layer of metal extending across the joint between the preformed member and the shell thereby to form a smooth exterior to the article as a whole and to give rigidity to the article as a whole.

2. In the art of forming hollow articles by electrolytic deposition the method which consists in forming a shell having an open end and having a thickness of the order of one about twenty-thousandths of an inch, inserting a collapsible chuck in the shell through said open end, spinning the shell about the chuck to form the shell into the configuration desired in the finished hollow article, while incidentally constricting said end, collapsing the chuck and withdrawing the same from the shell through said constricted end and subjecting the resulting shell to the action of an electrolytic bath to form on the shell a coating layer sufficient to give structural strength to the article.

3. In the art of forming hollow articles, the method which consists in locating in the open end of a cylindrical shell a collapsible chuck and a rugged preformed metallic collar having an annular groove at one end, spinning the open end of the shell into the groove and simultaneously causing the portion of the shell at its open end to conform to the outlines of the chuck and subjecting the resulting shell to the action of an electrolytic bath.

4. In the art of forming metallic receptacles, the method which consists in forming a thin cylindrical shell of electrolytically deposited metal having an open end and having structural strength merely sufficient to maintain its form but too weak to function as the intended receptacle, positioning in the open end a former comprising a chuck and a collar, with the collar provided with a recess and having a lip defining one side of the recess, pressing the open end of the thin shell into engagement with the chuck to cause said end to conform to the shape of the exposed face of the chuck, pressing the edge defining the open end of the shell into the recess and bending the lip into position overlapping the edges of the shell to secure the same permamently to the collar, withdrawing the chuck through the bore of the collar and subjecting the shell and collar to the action of an electrolytic bath until there is formed on the shell a coating sufficient to provide the requisite structural strength to the resulting receptacle.

5. In the art of forming metallic receptacles, the method which consists in forming a thin cylindrical shell of electrolytically deposited metal having an open end and having structural strength merely sufficient to maintain its form but too weak to function as the intended receptacle, positioning in the open end a collar, with the collar provided with a recess and having a lip defining one side of the recess, pressing the edge defining the open end of the shell into the recess and bending the lip into position overlapping the edges of the shell to secure the same permanently to the collar, and subjecting the shell and collar to the action of an electrolytic bath until there is formed on the shell a coating sufficient to provide the requisite structural strength to the resulting receptacle.

BLASIUS BART.